A. JACQUOT.
SLED ATTACHMENT FOR AUTOMOBILES.
APPLICATION FILED NOV. 24, 1917.
1,304,183.
Patented May 20, 1919.
2 SHEETS—SHEET 1.
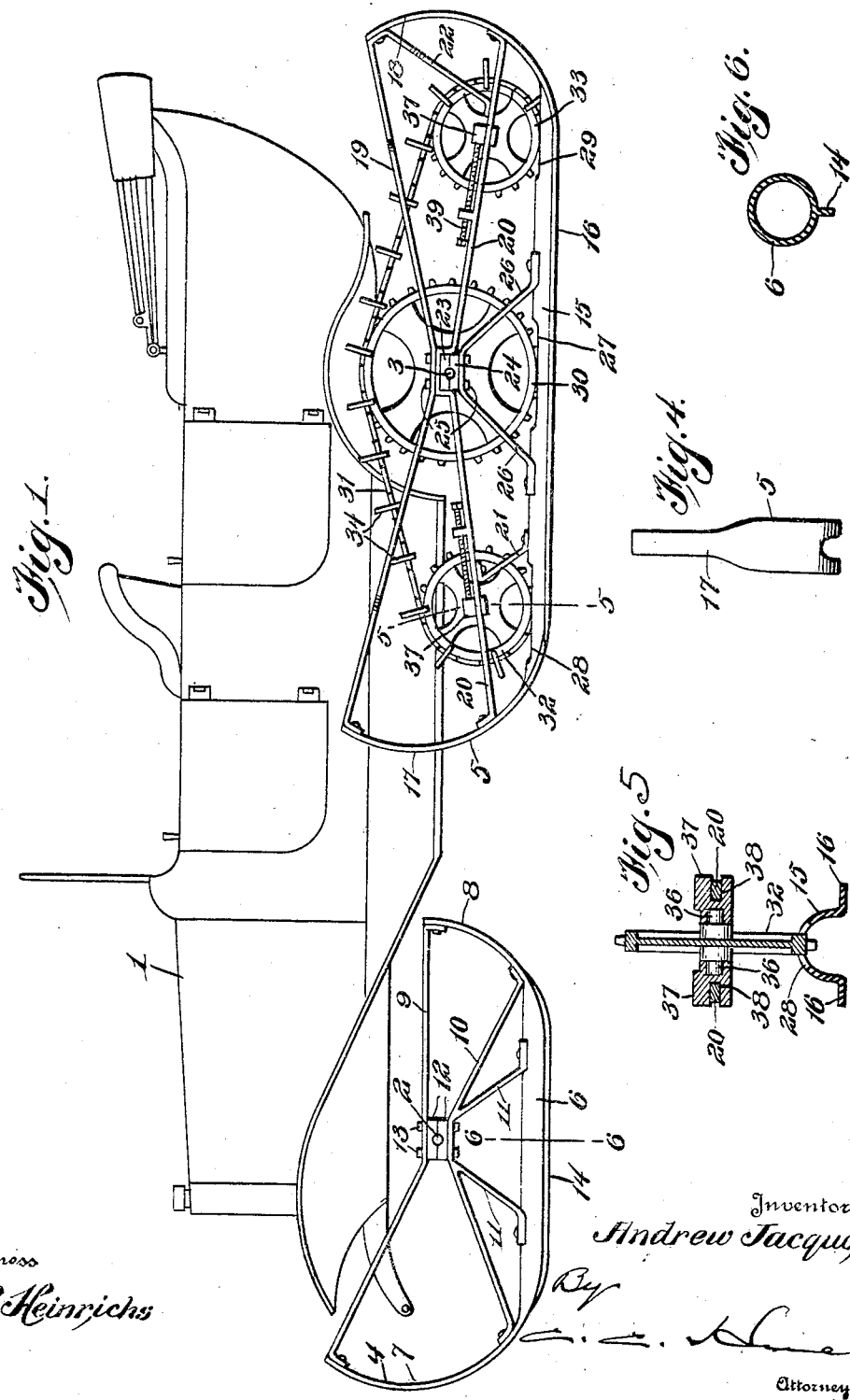
Witness
L. R. Heinrichs
Inventor
Andrew Jacquot
By
Attorney A. JACQUOT.
SLED ATTACHMENT FOR AUTOMOBILES.
APPLICATION FILED NOV. 24, 1917.
1,304,183.
Patented May 20, 1919.
2 SHEETS—SHEET 2.
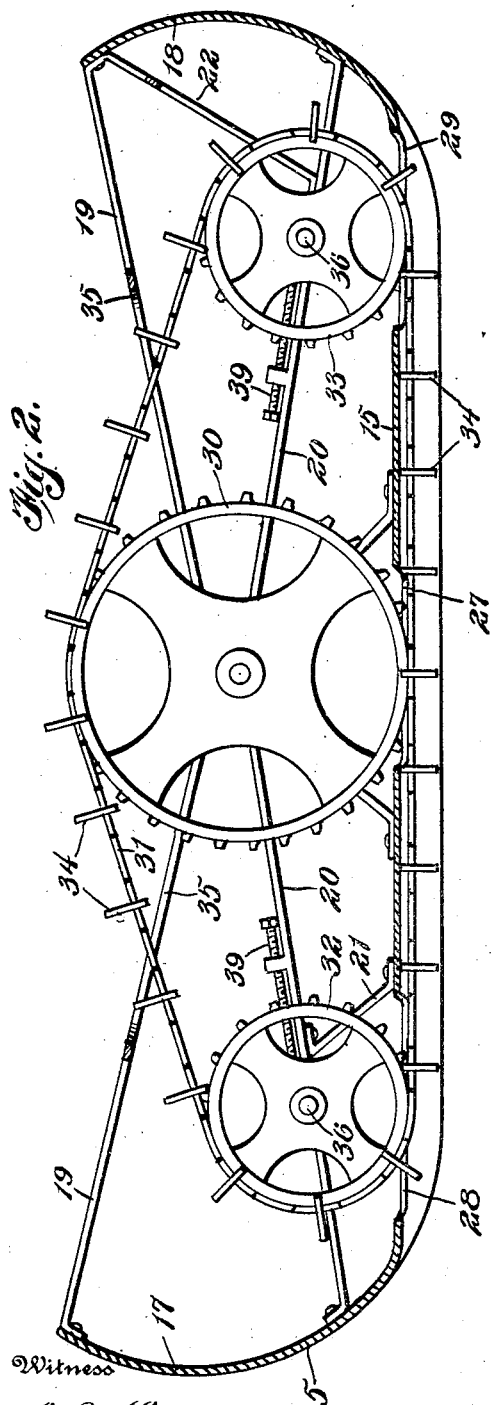
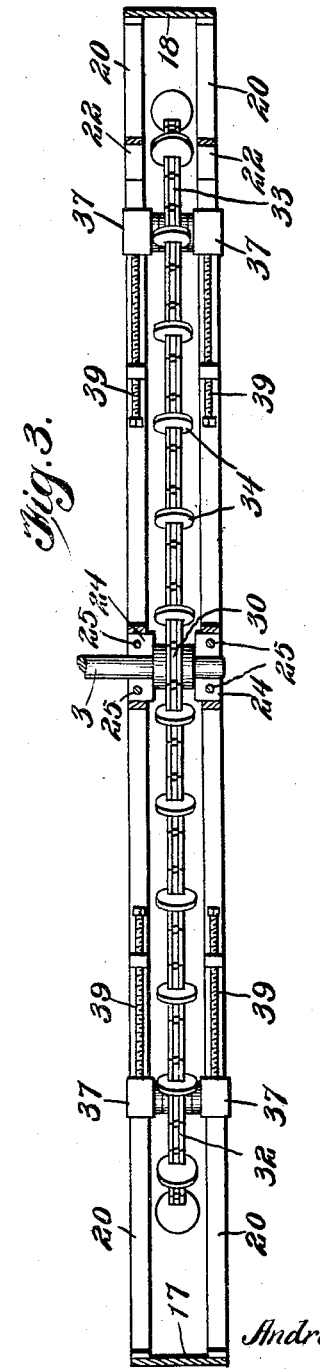
Inventor
Andrew Jacquot

UNITED STATES PATENT OFFICE.

ANDREW JACQUOT, OF CATLOW, OREGON.

SLED ATTACHMENT FOR AUTOMOBILES.

1,304,183.   Specification of Letters Patent.   Patented May 20, 1919.

Application filed November 24, 1917. Serial No. 203,704.

*To all whom it may concern:*

Be it known that I, ANDREW JACQUOT, a citizen of the United States, residing at Catlow, in the county of Harney and State of Oregon, have invented new and useful Improvements in Sled Attachments for Automobiles, of which the following is a specification.

This invention relates to a sled attachment for automobiles, the object of the invention being to provide runners which may be applied to the automobile axles in place of the wheels for converting the vehicle into a traveling sled, and also to provide means for propelling the sled in a reliable and effective manner.

A further object of the invention is to provide sled runner attachments which may be easily and conveniently applied and removed, which are adapted to secure a firm grip upon the ice or snow for traction purposes and prevent the vehicle from skidding, and which are light in weight and at the same time strong and durable in construction.

A still further object of the invention is to provide a propelling mechanism associated with the rear runners and embodying drive chains of a structure coöperating with the rear runner structure to secure a firm grip upon the ice or snow and propel the vehicle at any desired speed.

The invention consists of the features of construction, combination and arrangement of parts, hereinafter fully described and claimed, reference being had to the accompanying drawings, in which:—

Figure 1 is a side elevation of an automobile showing the application of the invention.

Fig. 2 is a vertical longitudinal section through one of the rear runners and showing the driving or propelling means associated therewith.

Fig. 3 is a sectional plan view of the same.

Fig. 4 is a front elevation of one of the rear runners.

Fig. 5 is a vertical transverse section on the line 5—5 of Fig. 1.

Fig. 6 is a vertical transverse section on the line 6—6 of Fig. 1.

Referring to the drawings, 1 designates an automobile of any ordinary or preferred type, 2 the front axle spindles of the automobile, and 3 one of the divided sections of the rear axle of the automobile, it being understood that the invention contemplates the application of front and rear runners and drive mechanism in duplicate at opposite sides of the vehicle.

Mounted upon each front axle spindle is a front runner 4, and mounted upon each rear axle section is a rear runner 5, which runners are applied to the vehicle in place of the usual wheels for converting the vehicle into a motor sled.

Each front runner 4 comprises a body or base portion 6 of hollow or tubular, preferably cylindrical, form and having upturned front and rear ends 7 and 8, composed of longitudinally curved flat strips of metal, the said ends 7 and 8 being united at their upper extremities by an upper brace member 9 and at their lower ends by a lower brace member 10. The lower brace member 10 is provided with bracing arms 11 connected with the front and rear portions of the runner body, the bracing members coöperating to rigidly stay the parts of the runner against breakage or deflection. Clamping members 12 of suitable construction are carried by the brace members 9 and 10 to engage the axle spindle 2 and are united by bolts or other suitable fastenings 13, whereby the runner is clamped to the spindle against independent motion, but is adapted to swing or turn therewith for a steering action of the vehicle, as will be readily understood. The tubular or cylindrical form of the runner body 6 gives great strength and durability, and this portion of the runner is provided with a depending fin or flange 14 to engage the snow or ice and guide the runner in its movements, as well as to prevent side slippage or skidding.

It will thus be understood that the two front runners applied to the front axle spindles will be rigidly secured thereto to support the front end of the vehicle and so as to be moved to the right and left by the steering gear of the automobile for guiding or steering the vehicle in its course of travel.

Each rear runner 5 comprises a body portion 15 of channeled form, preferably of inverted U-shape and having laterally extending horizontal bearing flanges 16. The channeled form of the runner 15 adapts the runner to serve as a guide for the propelling blades, hereinafter described, and also to allow the snow or ice to pack therein so that the working efforts of the propeller blades will be concentrated and the blades protected from injury, while such form of the runner also gives great strength and durability. The runner body is also adapted to have a certain range of yielding action when striking hardened particles of ice or snow or when striking hard surfaces to cushion the shock and prevent injury thereto, while the flanges 16 serve as bearing surfaces to stably support the runner and prevent the same from sinking too deeply into the snow or ice. By confining a portion of the ice or snow within the channeled runner the runners are also prevented from having sidewise movement, and thus prevent the rear portion of the vehicle from slipping or skidding laterally.

The runner body 15 is provided with upturned front and rear ends 17 and 18 similar in general form to the ends 7 and 8 of the front runner, said runner ends 17 and 18 being connected at their upper ends by a longitudinally extending upper main brace 19 and at their lower ends by a longitudinally extending lower main brace 20. Supplemental braces 21 and 22 also connect the lower main brace with the forward portion of the runner body and said lower main brace with the rear end of the upper main brace and upturned end 18, thus increasing the strength of construction. The braces 19 and 20 converge from their ends to their central portions where they are united to each other and to a bearing member 23, secured to a coöperating bearing member 24 by bolts or other suitable fastenings 25, the brace 20 being provided with an offset to receive and house the bearing member 23. The bearing member 24 is carried by an inverted V-shaped brace 26 secured to the runner body 15, and said bearing members receive the axle section 3, whereby the runner is secured thereto for vertical play with the axle and the axle is journaled in the bearings for rotary motion.

The top portion of the runner body 15 is formed with a central slot 27 and front and rear end slots 28 and 29 to receive the teeth of a central drive sprocket wheel 30. The drive wheel 30 is connected or otherwise secured to the axle and arranged to transmit motion to a drive chain 31, arranged in the form of an elongated loop, the stretches of which are engaged for driving action by the teeth of the gear 31 and by the teeth of front and rear guide sprocket wheels 32 and 33 around which the ends of the chain pass. The lower stretch of the chain passes through the openings 28 and 29 and travels in the channel of the runner body 15. Arranged at suitable intervals upon the links of the chain are propeller blades 34 of disk-like form which are adapted in their passage through the channeled runner and the lower stretch of the chain to engage the surface of the ice or snow and impinge thereagainst to propel the vehicle, as will be readily understood. It will be observed that the blades traveling in the channel are held from sidewise deflection and braced by the walls of the channel, and are thus restrained from twisting or turning and protected from breakage and are adapted to be maintained firmly in contact with the ice or snow to concentrate their driving efforts or action in an obvious manner.

The end portions of the upper main brace 19 are forked or slotted at 35 to receive the upper portion of the drive wheel 30 and to permit travel of the chain therethrough, while the lower main brace 20 consists of spaced bracing members arranged on opposite sides of the axis of the wheels to permit of the rotation of the sprocket wheels and passage of the chain therebetween. Each wheel 32 and 33 is provided with a stub shaft 36 for spindles which rotate in bearing members 37 formed with grooves 38 slidably engaging the spaced portions of the brace 20, whereby the sprocket wheels 32 and 33 are adapted to be adjusted with respect to the sprocket wheel 30 to take up any slack in the chain 31. For the purpose of adjusting the sprocket wheels 32 and 33 adjusting screws 39 are provided which are mounted upon the spaced brace sections 20 and engage the bearing members 37, whereby through the adjustment of said bearing members the sprockets 32 and 33 are rendered adjustable in a convenient manner to keep the chain as taut as desired.

It will be understood that in practice the drive chains at the opposite sides of the vehicle receive driving power from the sections 3 of the rear driving axle, and that these chains travel over the sprocket wheels and the lower stretch thereof in passing through the channeled bodies of the rear runners is disposed in parallel relation to the surface of the ground, so that the propelling disks or blades 34 thereon will impinge against the surface of the ice or snow and propel the vehicle forward or backward according to the direction of motion of the rear axle. The construction also is such that the opposite propeller chains may be driven at different speeds through the action of the differential gearing of the rear axle to facilitate the turning of the vehicle. In applying the runners to the automobile, it is simply necessary to remove the front and rear wheels and apply the runners in their place, whereupon the automobile will be converted into a motor sleigh in a ready and convenient manner, the drive mechanism of the rear runners being coupled to the rear axle sections when the runners are applied without further application or adjustment of parts. It will be seen that the runners are simple in construction, as well as of maximum strength and durability, and that they are adapted to easily support the vehicle and run freely in contact with the surface of the ice or snow, while preventing any lateral or sidewise motion of the vehicle except through the steering mechanism. A chain drive is also provided which will give a maximum propelling effect, enabling the motor sleigh to be propelled with high power and speed.

Having thus fully described my invention, I claim:

In a sled attachment for automobiles, the combination of rear runners having bearings rotatably receiving the rear axle sections of the vehicle, said rear runners each including an inverted U-shaped channeled body provided with laterally extending flanges and having central and front and rear openings in the crown wall thereof, a drive gear fixed to the rear axle section and having its lower portion movable through said central opening, front and rear guide sprockets on each rear runner having their lower portions movable through the front and rear openings in said runner body, and a looped chain extending around the drive and guide sprockets of each rear runner and having a lower stretch extending through the channel of the runner body, said chain being provided at spaced intervals with propeller blades operating in said channel.

In testimony whereof I affix my signature.

ANDREW JACQUOT.